US 6,688,899 B2

(12) United States Patent
Rumpel

(10) Patent No.: US 6,688,899 B2
(45) Date of Patent: Feb. 10, 2004

(54) SMART CARD CONNECTOR AS WELL AS SWITCH CONTACT ELEMENTS, IN PARTICULAR FOR A SMART CARD CONNECTOR

(75) Inventor: Jochen Rumpel, Nordheim (DE)

(73) Assignee: Amphenol-Tuchel Electronics GmbH (DE)

( * ) Notice: Subject to any disclaimer, the term of this patent is extended or adjusted under 35 U.S.C. 154(b) by 0 days.

(21) Appl. No.: 09/978,015

(22) Filed: Oct. 17, 2001

(65) Prior Publication Data

US 2002/0045372 A1 Apr. 18, 2002

(30) Foreign Application Priority Data

Oct. 18, 2000 (DE) .......................................... 100 51 693

(51) Int. Cl.[7] .............................................. H01R 29/00
(52) U.S. Cl. ........................ 439/188; 439/489; 439/325
(58) Field of Search .................................. 439/188, 489, 439/325, 329; 200/51.09, 51.01; 235/441, 486

(56) References Cited

U.S. PATENT DOCUMENTS

| 4,459,440 | A | * | 7/1984 | Wiczer | 200/246 |
|---|---|---|---|---|---|
| 5,370,544 | A | * | 12/1994 | Reichardt et al. | 439/188 |
| 5,470,243 | A | * | 11/1995 | Bendorf | 439/188 |
| 5,653,610 | A |   | 8/1997 | Broschard, III | 439/630 |
| 6,004,155 | A | * | 12/1999 | Wu | 439/489 |
| 6,073,853 | A | * | 6/2000 | Odic | 439/188 |
| 6,120,310 | A | * | 9/2000 | Chang | 439/188 |
| 6,129,570 | A | * | 10/2000 | Griffin et al. | 439/188 |
| 6,296,500 | B1 | * | 10/2001 | Liao | 439/489 |

FOREIGN PATENT DOCUMENTS

| DE | 195 21 360 A | 5/1996 |
|---|---|---|
| EP | 0 669 590 A | 8/1995 |

* cited by examiner

Primary Examiner—Tho D. Ta
Assistant Examiner—Briggitte R. Hammond
(74) Attorney, Agent, or Firm—Blank Rome LLP

(57) ABSTRACT

A smart card connector has a contact support in which reading contacts and at least two switch contact elements forming a switch are provided, which senses the presence or non-presence of a smart card in the smart card connector. The at least two switch contact elements are identical built and are arranged symmetrically in the contact support, such that the smart card brings at least one of the switch contact elements into contact with the other switch contact element or opens an established contact to open or close the switch in order to provide an indication of the presence or non-presence of the card.

13 Claims, 3 Drawing Sheets

SMART CARD CONNECTOR AS WELL AS SWITCH CONTACT ELEMENTS, IN PARTICULAR FOR A SMART CARD CONNECTOR

TECHNICAL FIELD

The invention relates to a smart card connector as well as to switch contact elements, in particular for a smart card connector.

BACKGROUND ART

Smart card connectors often use a card presence switch, which comprises switch contact elements. Said switch indicates the presence of a card in the smart card connector, or indicates the end position of the card.

Known switch contacts forming such a card presence switch, have differently shaped contact arms to provide for a predefined contact point. The contact point is defined by two longitudinal crests positioned perpendicular to each other (crossed longitudinal crests). The differently shaped contact arms result in more complex and more expensive cutting tools for the production of the switch contacts. Furthermore, the different geometrical circumstances have to be taken into account during electroplating. Also different processes and courses are necessary during the mounting of said known contact arms being shaped differently from another.

DISCLOSURE OF THE INVENTION

The present invention intends to provide a smart card connector and in particular a switch, and in particular switch contact elements, that can be used in a switch in a smart card connector and which minimize or avoid expenditures during electroplating, cutting and mounting, as well as maintain at the same time a well-defined contact (crossed longitudinal crests).

In short, the invention provides a smart card connector according to claim 1 and 13 as well as a card presence switch and a switch contact element. Preferred embodiments of the present invention are defined in the dependent claims.

The switch in accordance with the present invention has, in general, two identically built and symmetrically arranged switch contact elements, which in particular comprise two identically built and symmetrical arranged contact arms. Therefore only one type of geometry has to be produced during the cutting process. The electro plating can be optimized with respect to one component and still a "complete" switch can be formed using at least two identical specimens of said component. Last but not least, two equal or identical processes can be employed for mounting both of the switch contact elements.

In order to maintain a well defined contact with the arrangement of "crossed longitudinal crests" a bead in an angle of about 45 degrees is stamped or imprinted in the contact area and, as such, forms a longitudinal crest on the opposite side of the contact area. Since both switch contact elements are being mounted in a mirror inverted (symmetrical) fashion into a contact support, an angle of about 90 degrees is defined at which the two longitudinal crests contact each other and as such a well-defined contact point is formed.

As will be explained further down below, the switch contact elements of the present invention are embodied to be latched into a contact support. Similar to reading contacts, which are normally present in the contact support, the switch contact elements are suitable for Reflow-soldering.

Preferentially, the switch contact elements are provided as normally-closed (NC) contact elements, which allow for a direct sampling of the presence of a card. Since a NC-switch must be provided with a pretension in the contact elements, there is a certain difficulty to guarantee the operation of the switches after the Reflow-soldering. This problem is also addressed by the contact elements of the present invention. The latching plane or the mounting plane of the switching elements of the present invention is perpendicular to the plane, in which the contact arms extend in their width. Now, in order to guarantee the suitability for soldering in a Reflow-oven for such a switch, it is necessary to keep the service pressure generated by the pretension so low that a relaxation of the form material of the contact support, and as such the loss of the pretension of the switch contact elements, is being prevented.

This is being achieved by a specific design measure: The latching plane of the switch contact elements has been intentionally lengthened in accordance with the present invention. Thereby the side area, which transmits the abutment forces on the material of the contact support, is large enough. As a consequence, the surface pressure caused by pretension and/or switch operation is of a magnitude, which causes only very small relaxation losses. The intentional lengthening of the latch plane is being held in a "pocket" in the material of the contact support. It thus offers the switch contact element as a whole additional support in the contact support.

BRIEF DESCRIPTION OF THE DRAWINGS

An embodiment of the invention is disclosed in the drawings and will be described in detail below. In the drawing.

BEST MODE FOR CARRYING OUT THE INVENTION

Figure 1:
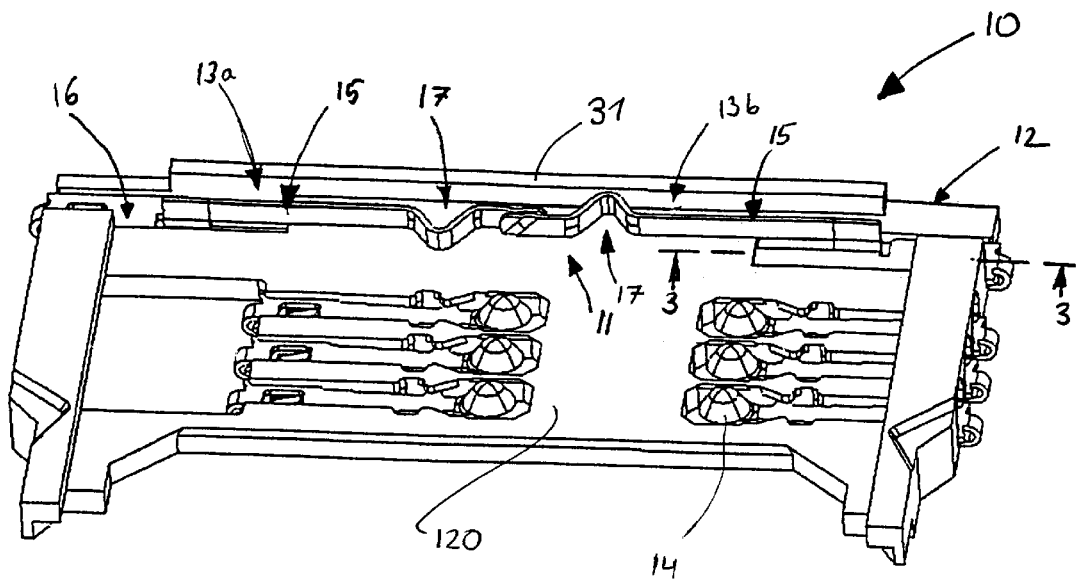
FIG. 1 is a perspective top plan view of a smart card connector according to an embodiment of the present invention.

The present invention relates to a smart card connector and in particular to a SIM-card reader 10 depicted in FIG. 1, which is employed to receive and contact a smart card, preferably a SIM-card. The smart card connector 10, made of an insulating material, comprises a contact support 12, which is designed to receive the smart card (not shown) accordingly and which supports in addition read contacts 14. The smart card is inserted from the front into the contact support 12 and placed on a card support floor 120, wherein contact zones of the smart card come to rest on the card support floor 120 and on respective read contacts 14.

In accordance with the present invention, there is a card presence switch 11 located in the back portion of the smart card connector 10 in the card support floor 120 close to an end wall 31 which extends perpendicular to the floor 120 in an upward direction. Switch 11 is used to indicate whether a smart card has been inserted or loaded into the contact support 12. The smart card connector 10 comprises two switch contact elements 13a, 13b.

Description of One of the Switch Contact Elements

According to FIGS. 2 to 6, one of the switch contact elements 13a, 13b will be described. However, it is emphasized, that both switch contact elements are identical.

Figure 2:
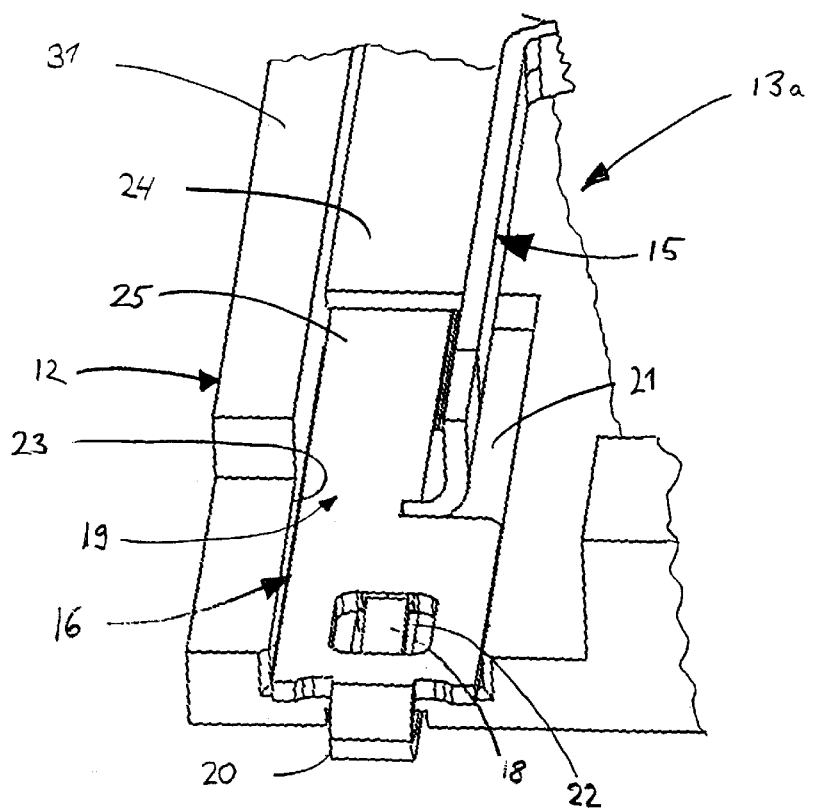
FIG. 2 is an enlarged side view of a detail of the smart card connector as seen from the left in FIG. 1.

The switch contact elements 13a, 13b respectively comprise a mounting portion 16, a contact arm 15 and a contact arm end portion 17. The mounting portion 16, which can be seen best in FIG. 2, is used for fixedly mounting the switch contact element 13a, 13b to the contact support 12. The mounting portion 16 comprises a flat rest portion 19, which is formed together with the contact arm 15 preferably from a single piece of sheet metal. The rest portion 19 is located in a plane perpendicular to the plane in which the contact arm 15 extends in its width. In the same plane, which in the following will be designated the mounting plane and in which the rest portion 19 is arranged, a contact insertion portion 25 is located.

Figure 3:
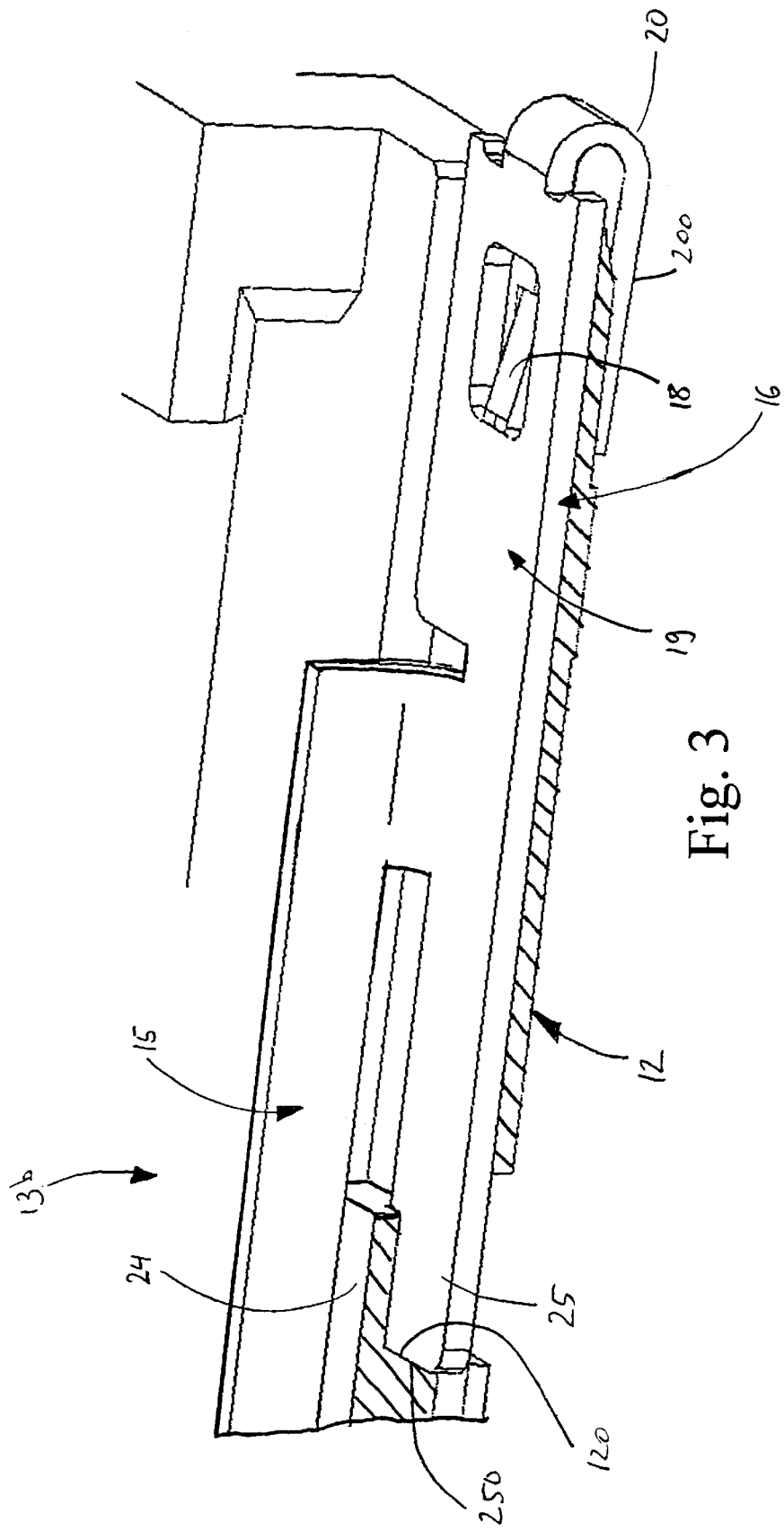
FIG. 3 is a sectional view along the line 3—3 of FIG. 1.

The contact insertion portion 25 can be seen best in FIG. 3. It forms part of the rest portion 19 and comprises an abutment surface 250 perpendicular to the extension of the rest portion 19. Also, the rest portion 19 comprises an opening with a latch hook 18 pointing downwards. At the outer right end (FIG. 3) of the flat rest portion 19 a U-shaped element 20 is formed, the lower surface 200 of which forms a soldering surface.

As mentioned before, the elongated contact arm 15 is shaped as a longitudinal slat shaped body and connects the mounting portion 16 with the contact arm end portion 17. It is located in a right angle to the plane of the mounting portion 16. The contact arm end portion 17 (see FIGS. 5 and 6) comprises a projecting part 26 as well as a contact portion 30. While the projecting portion 26 projects relative to the contact support 12 to the front or to the back when the switch contact elements have been mounted, the contact portion 30 is located in the plane of the contact arm 15. The contact portion 30 comprises a contact surface 27, on which a longitudinal crest 28 is located, which is preferentially formed by a bead. The longitudinal crest 28 runs diagonally across the contact surface 27.

In the preferred embodiment the longitudinal crest 28 is arranged in a 45 degree angle relative to an axis running through the contact arm 15 and the contact surface 27. In the mounted position, the longitudinal crest 28 of one contact element 13a crosses with the longitudinal crest 28 of the other identical switch contact element 13b. Both crests provide a contact (crossed longitudinal crest), if the switch contact elements 13a, 13b are in engagement.

Mounting of the Switch Contact Elements

To form the switch 11 for sensing the presence or non-presence of a smart card in a smart card connector 10, two of the aforementioned switch contact elements 13a, 13b are being respectively mounted in the back portion of the contact support 12. The mounting is done in such a way that the contact arms 15 of the at least two contact elements 13a, 13b extend towards each other and are in general parallel to the upper surface of the contact support 12 and also in parallel to the end wall 31. In accordance with the present invention, there are two switch contact elements 13a, 13b which are identical and are being mounted symmetrically on the contact support 12.

Figure 4:
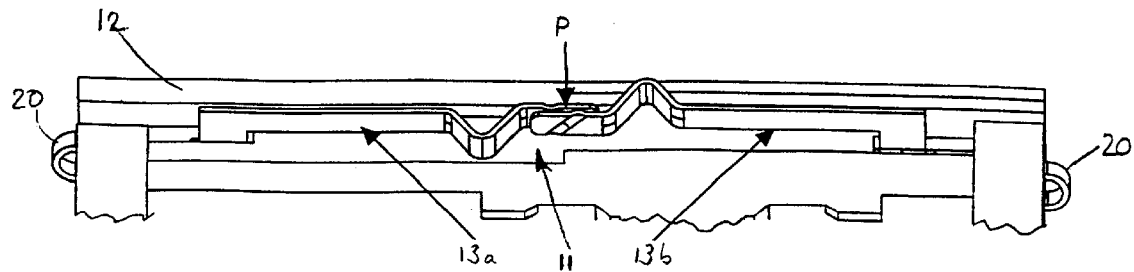
FIG. 4 is a partial top plan view of a back portion of the smart card connector of FIG. 1 and shows in more detail switch contact elements of a card presence switch employed to determine the card insertion status.
Figure 5:
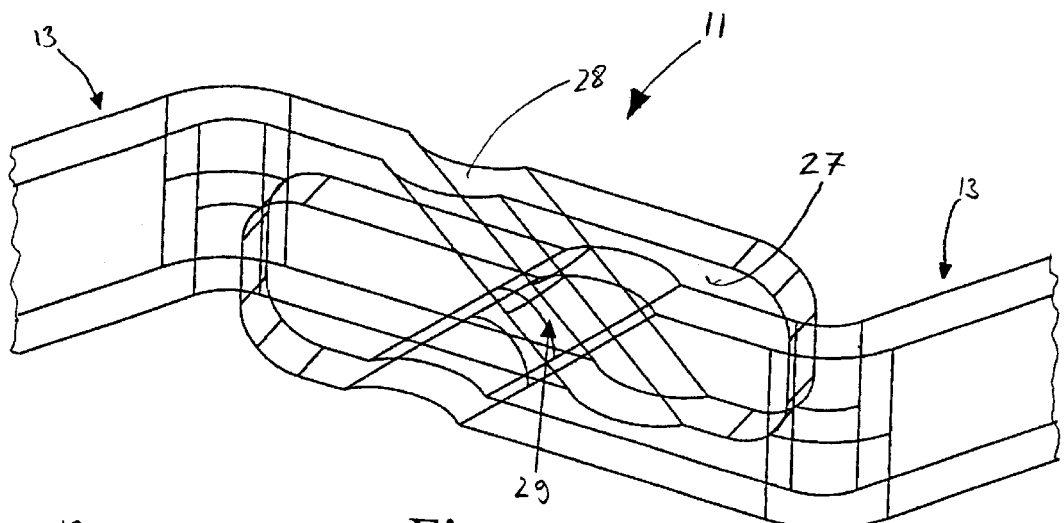
FIG. 5 is a schematic sketch of overlapping portions of the switch contact elements of FIGS. 1 to 4.
Figure 6:
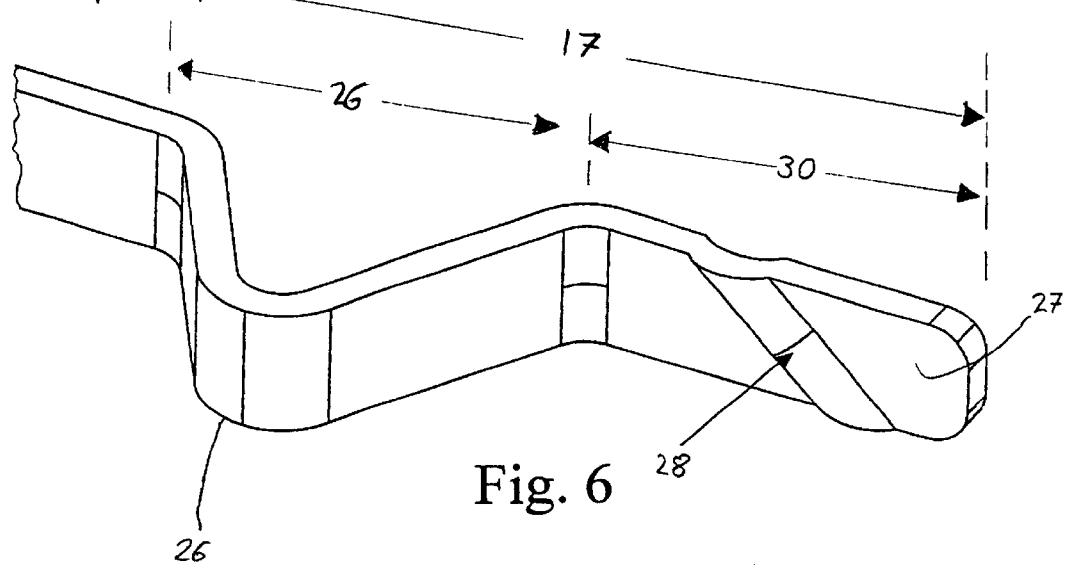
FIG. 6 is a perspective view of a detail of a contact arm end portion of one of the switch contact elements of the card presence switch of FIG. 1.

The symmetry characteristics are going to be explained in more detail with reference to FIG. 4. Since both switch contact elements 13a, 13b are identical, one switch contact element is respectively pushed on or slid on from each side of the contact support 12, such that contact surfaces 27 overlap, wherein the respective longitudinal crests 28 point towards each other and can be brought into contact with each other. If they are brought into contact the longitudinal crests 28 come to rest on each other and define a contact point 29. Preferably, the longitudinal crests 28 cross in an angle of 90 degrees. Because of the arrangement of the switch contact elements of the present invention a point symmetry with respect to the symmetry point P (see FIG. 4) is achieved. If both switch contact elements 13a, 13b are in engagement with each other, i.e. the switch is closed, the symmetry point P is the contact point 29.

For mounting the switch contact elements, the contact support 12 comprises in the back left portion and the back right portion, respectively, a recess 21 with an additional recess 22 provided in the recess 21. In addition, the contact support forms a cover 24 in the back intermediate portion, which together with the bottom of the contact support 12 forms a cavity or a pocket. The recess 21 of the contact support 12 forms longitudinal guide means 23 for proper insertion of the mounting portion 19. During the insertion of each one of the switch contact elements 13a, 13b from respective sides, initial guidance occurs by the longitudinal guide means 23 until the contact insertion portion 25 rests in the pocket formed by the cover until the rest portion 19 comes to rest in the recess 21. In the end position the abutting surface 250 of the contact insertion portion 25 lies in contact with a contact surface 120 of the contact support 12. Furthermore, in the end position the latch hook 18 latches into the additional recess 22 of the recess 21 because of a downward provided pretension. Thus a backwards movement of the switch contact elements 13a, 13b out of the end position is blocked. The U-shaped portion 20 is additionally in engagement with the lower surface of the contact support 12 when the switch contact elements 13a, 13b are in their end position and thus fixes the switch contact elements 13a, 13b additionally in their end positions.

In accordance with the present invention the contact insertion portion 25 of the switch contact element 13a extends adjacent to the inwardly facing end wall 31 (see FIG. 2) while the contact insertion portion of the other contact element 13b is offset with respect to said inwardly facing end wall 31.

Operation of the Card Presence Switch

In the preferred embodiment in which the switch contact elements 13a, 13b have been mounted, the longitudinal crests 28 are in contact with each other if no smart card is inserted (normally-closed; NC). If a smart card is being inserted, the projecting portion 26 of the switch contact element 13a comes into engagement with the smart card and will be deflected towards the back, thus opening the contact between both contact elements 13a, 13b, which existed beforehand. Thus, an indication whether a smart card has been inserted, is possible. The operation as discussed above, was described in connection with a closed switch if no smart card was present.

However, the present invention can equally be employed with separated contact crests forming an open contact if no smart card is present (normally-opened; NO). This can be achieved by relocating the switch contact element 13a sufficiently further to the front, so that the contact portion 30 of the switch contact element 13a is located before the contact portion 30 of the switch contact element 13b and the contact portions are spaced apart from each other. In addition, the longitudinal crests must be relocated to the opposite side of the contact surface 27.

In the described embodiment the switch contact elements 13a, 13b are inserted into the contact support 12. However, the switch contact elements 13a, 13b could also be incorporated e.g. by injection molding into the contact support 12.

Regarding the operation of the switch contact elements it is being remarked that the latch or mounting plane defined by mounting portions 16 of the switch contact elements 13a, 13b is perpendicular to the plane, in which the contact arm and the contact portion 30 extend widthwise. To guarantee in such a configuration the soldering properties in a Reflow-oven, it is necessary, to minimize the surface pressure caused by the pretension in order to prevent a relaxing of the material. Thus the loss of the pretension is avoided.

The above is achieved by extending the latch plane in form of a contact insertion surface 25. Hereby, the side surface, which transmits the abutment forces to the form material, is sized sufficiently large. Therefore the surface pressure caused by the pretension and/or the switch actuation is maintained in an interval, in which only slight relaxation losses are caused. As mentioned before, the intentional lengthening or extension is being held or received by a pocket in the form material formed by the cover 24 and thus offers additional hold and support for the switch contact element as a whole in the contact support 12.

What is claimed is:

1. A smart card connector comprising a contact support in which reading contacts and at least two switch contact elements forming a switch are located, wherein said at least two switch contact elements sense the presence or non-presence of a smart card in the smart card connector, wherein the two switch contact elements are shaped identically, wherein said two switch contact elements are arranged symmetrically in the contact support such that the inserted smart card brings at least one of the switch contact elements in contact with the other switch contact element or opens an established contact between said switch contact elements to respectively close an open said switch in order to provide an indication for the presence or non-presence of the card, wherein each of the switch contact elements comprises a contact arm, the contact arm comprising an end portion with a projecting portion and a contact surface, and wherein the contact surface comprises a diagonally located longitudinal crest that extends in an angle of preferably 45 degrees to the longitudinal axis of the contact arms, wherein each of the contact arms extends in a first plane and each of the switch contact elements comprises a mounting portion extending in a second or mounting plane, said first and second planes are perpendicular with respect to each other, and wherein the mounting portion comprises a latch hook in the rest portion and the recess in the contact support provides an additional recess, wherein the latch hook is pressed into the additional recess by a pretension when the switch contact element is mounted on the contact support and thus a sliding off of the switch contact elements from the contact support is prevented.

2. A smart card connector comprising a contact support in which reading contacts and at least two switch contact elements forming a switch are located, wherein said at least two switch contact elements sense the presence or non-presence of a smart card in the smart card connector, wherein the two switch contact elements are shaped identically, wherein said two switch contact elements are arranged symmetrically in the contact support such that the inserted smart card brings at least one of the switch contact elements in contact with the other switch contact element or opens an established contact between said switch contact elements to respectively close and open said switch in order to provide an indication for the presence or non-presence of the card, wherein each of the switch contact elements comprises a contact arm, the contact arm comprising an end portion with a projecting portion and a contact surface, and wherein the contact surface comprises a diagonally located longitudinal crest that extends in an angle of preferably 45 degrees to the longitudinal axis of the contact arms, wherein each of the contact arms extends in a first plane and each of the switch contact elements comprises a mounting portion extending in a second or mounting plane, said first and second planes are perpendicular with respect to each other, and wherein the contact support comprises a cover, forming a pocket, and the mounting portion comprises a contact insertion portion, which rests in the formed pocket when the switch contact element has been mounted.

3. A smart card connector with a contact support in which reading contacts and at least two switch contact elements forming a card presence switch are being provided, which sense the presence or non-presence of a smart card in the smart card connector, wherein the switch contact elements each comprise a mounting portion to fixedly mount the switch contact elements to the contact support and are arranged such that the smart card brings at least one of the switch contact elements into contact with the other switch contact element or opens an established contact to open or close the switch in order to provide an indication for the presence or non-presence of the card, wherein the mounting portion comprises a flat rest protion for transmitting abutment forces to a material forming the contact support, and a contact insertion portion and wherein the contact support comprises a recess, which accommodates the rest portion in the mounted position of the switch contact elements, and a cover forming a pocket; said contact insertion portion resting in the formed pocket when the switch contact element has been mounted.

4. The smart card connector of claim 3, wherein the mounting portion comprises a latch hook in the rest portion and the recess in the contact support provides an additional recess, wherein the latch hook is pressed into the additional recess by a pretension when the switch contact element is mounted on the contact support and thus a sliding off of the switch contact elements from the contact support is prevented.

5. The smart card connector of claim 3, wherein the mounting portion comprises a U-shaped portion, which guides a slide-on movement of the switch contact elements on the contact support.

6. The smart card connector of claim 3, wherein said contact support comprises longitudinal guiding means for guiding the rest portion and the contact insertion portion of the mounting portion.

7. The smart card connector of claim 3, wherein each of the switch contact elements comprises a contact arm extending in a first plane and a mounting portion extending in a second or mounting plane, said first and second planes are perpendicular with respect to each other.

8. The smart card connector of claim 7, wherein the contact arm of each of the switch contact element comprises a contact arm end portion with a projecting portion and a contact surface.

9. The smart card connector of claim 8, wherein the contact surface comprises a diagonally located longitudinal contact crest which is formed by a bead, and wherein the longitudinal crests of the switch contact elements cross each other and come to rest on each other to define a contact point, if the switch is closed.

10. The smart card connector of claim 8, wherein the longitudinal crests extend in an angle of preferably 45 degrees to the longitudinal axis of the contact arms.

11. The smart card connector of claim 3, wherein the switch is closed if no smart card is present in the contact support and wherein after the insertion of the smart card the switch is opened.

12. The smart card onnector of claim 3, wherein the switch is open if no smart card is present in the contact support and wherein after the insetion of the smart card the switch is closed.

13. The smart card connector of claim 7, wherein the projecting portion of one of the switch contact elements comes into contact with the smart card, when it is being inserted in order to displace the contact arm, while the projecting portion on the at least one other contact element is used to support the contact arm with respect to an end wall or an abutment of the contact support.

* * * * *

UNITED STATES PATENT AND TRADEMARK OFFICE
CERTIFICATE OF CORRECTION

PATENT NO. : 6,688,899 B2
DATED : February 10, 2004
INVENTOR(S) : Jochen Rumpel

It is certified that error appears in the above-identified patent and that said Letters Patent is hereby corrected as shown below:

<u>Title page,</u>
Item [57], ABSTRACT,
Line 5, change "identical" to -- identically --.

<u>Column 1,</u>
Line 41, change "claim 1 of 13" to -- claims 1 and 13 --;
Lines 42 and 43, change "and a switch contact element" to -- in accordance with claim 25 and a switch contact element in accordance with claim 26 --.

<u>Column 3,</u>
Line 35, change "located in" to -- located at --.

<u>Column 5,</u>
Line 15, before "form" insert -- the --.

Signed and Sealed this

Fourth Day of April, 2006

JON W. DUDAS
*Director of the United States Patent and Trademark Office*